United States Patent
Singh et al.

(10) Patent No.: US 12,414,165 B1
(45) Date of Patent: *Sep. 9, 2025

(54) FORMULATION AND ENFORCEMENT OF A CONNECTIVITY POLICY IN A WIRELESS NETWORK ENVIRONMENT

(71) Applicant: CSC Holdings, LLC, Bethpage, NY (US)

(72) Inventors: Maheshwar Singh, Roslyn Heights, NY (US); Jiten Patel, Wantagh, NY (US); Paul Hess, Rocky Point, NY (US)

(73) Assignee: CSC Holdings, LLC, Bethpage, NY (US)

( * ) Notice: Subject to any disclaimer, the term of this patent is extended or adjusted under 35 U.S.C. 154(b) by 364 days.

This patent is subject to a terminal disclaimer.

(21) Appl. No.: 17/878,239

(22) Filed: Aug. 1, 2022

Related U.S. Application Data

(63) Continuation of application No. 16/731,469, filed on Dec. 31, 2019, now Pat. No. 11,432,345.

(51) Int. Cl.
*H04W 76/10* (2018.01)
*H04W 4/02* (2018.01)

(52) U.S. Cl.
CPC ........... *H04W 76/10* (2018.02); *H04W 4/023* (2013.01)

(58) Field of Classification Search
CPC ............................. H04W 4/023; H04W 76/10
See application file for complete search history.

(56) References Cited

U.S. PATENT DOCUMENTS

| | | | |
|---|---|---|---|
| 6,208,631 B1 | 3/2001 | Kim | |
| 9,775,037 B2 | 9/2017 | Huber et al. | |
| 9,930,670 B2 | 3/2018 | Yi et al. | |
| 10,172,047 B2* | 1/2019 | Zhang | H04W 36/0061 |
| 2009/0325566 A1* | 12/2009 | Bell | H04W 8/22 455/419 |
| 2010/0330957 A1* | 12/2010 | Harada | H04M 15/51 455/406 |
| 2011/0130138 A1 | 6/2011 | Lee et al. | |
| 2013/0155851 A1 | 6/2013 | Koodli et al. | |
| 2014/0185469 A1 | 7/2014 | Marmolejo-Meillon et al. | |
| 2015/0341834 A1* | 11/2015 | Lee | H04L 5/1438 370/332 |
| 2016/0226705 A1* | 8/2016 | Toner | H04L 67/55 |
| 2016/0292799 A1 | 10/2016 | DeRosia et al. | |
| 2017/0078956 A1 | 3/2017 | LeBlanc | |
| 2017/0272317 A1 | 9/2017 | Singla et al. | |

(Continued)

*Primary Examiner* — Dai Phuong
(74) *Attorney, Agent, or Firm* — Lowenstein Sandler LLP

(57) ABSTRACT

The formulation and execution of a connectivity policy is disclosed herein to improve the performance of a wireless network (WN). A wireless access point (WAP) within the WN identifies electronic devices that have been granted access to the WN and/or are associated with the WAP to provide a connectivity catalog that forms the basis of the connectivity policy. This connectivity catalog is communicated to other WAPs within the network. In some situations, these other WAPs can execute the connectivity policy to deny access to electronic devices within the connectivity catalog to their corresponding networks. For example, these other WAPs can execute the connectivity policy on those electronic devices that are within a prescribed connectivity distance from the WAP that provided the connectivity catalog.

20 Claims, 11 Drawing Sheets

(56) References Cited

U.S. PATENT DOCUMENTS

Figure 1:
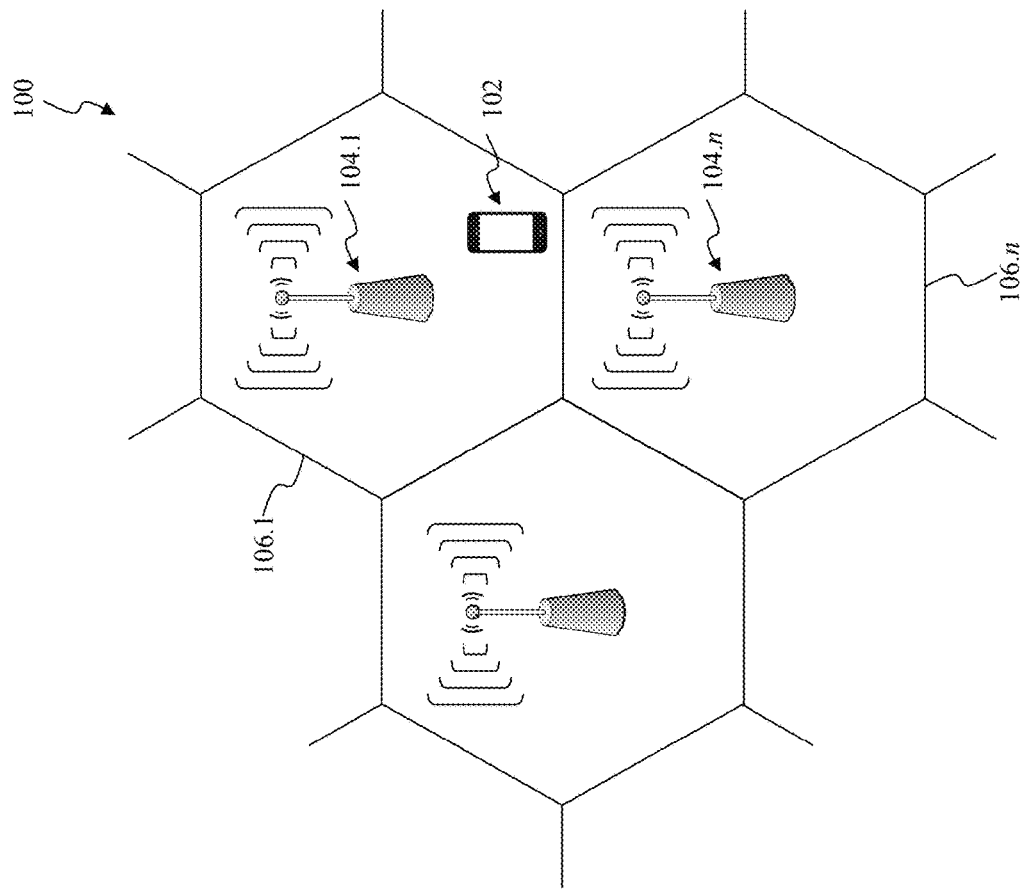
Figure 1:
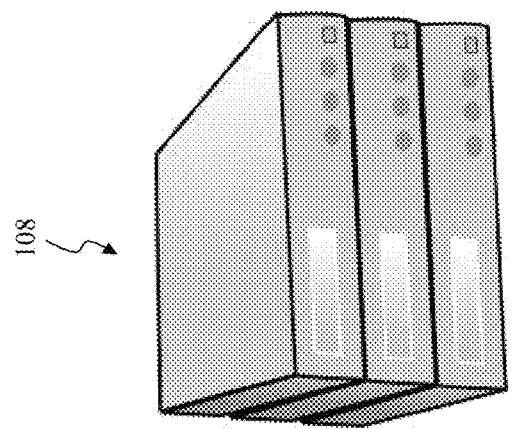

| | | |
|---|---|---|
| 2017/0347388 A1 | 11/2017 | Cai et al. |
| 2018/0137078 A1 | 5/2018 | Kohtz et al. |
| 2019/0075469 A1 | 3/2019 | Mahonet et al. |
| 2019/0174426 A1 | 6/2019 | Lee |
| 2019/0303807 A1 | 10/2019 | Gueye |
| 2019/0320385 A1* | 10/2019 | Bhartia ................ H04W 76/10 |
| 2021/0112487 A1* | 4/2021 | Sasabe ................ H04W 48/16 |

* cited by examiner

FORMULATION AND ENFORCEMENT OF A CONNECTIVITY POLICY IN A WIRELESS NETWORK ENVIRONMENT

CROSS-REFERENCE TO RELATED APPLICATIONS

This application is a continuation of U.S. patent application Ser. No. 16/731,469, filed Dec. 31, 2019, now U.S. Pat. No. 11,432,345, which is incorporated herein by reference herein in its entirety.

BACKGROUND

A service provider of a service provider system provides a service, such as communication of video, audio, and/or data to provide some examples, to one or more subscriber devices of the service. The conventional point-to-multipoint communication system often includes multiple access points through which the one or more subscriber devices can access the service.

BRIEF DESCRIPTION OF THE DRAWINGS/FIGURES

Figure 2A:
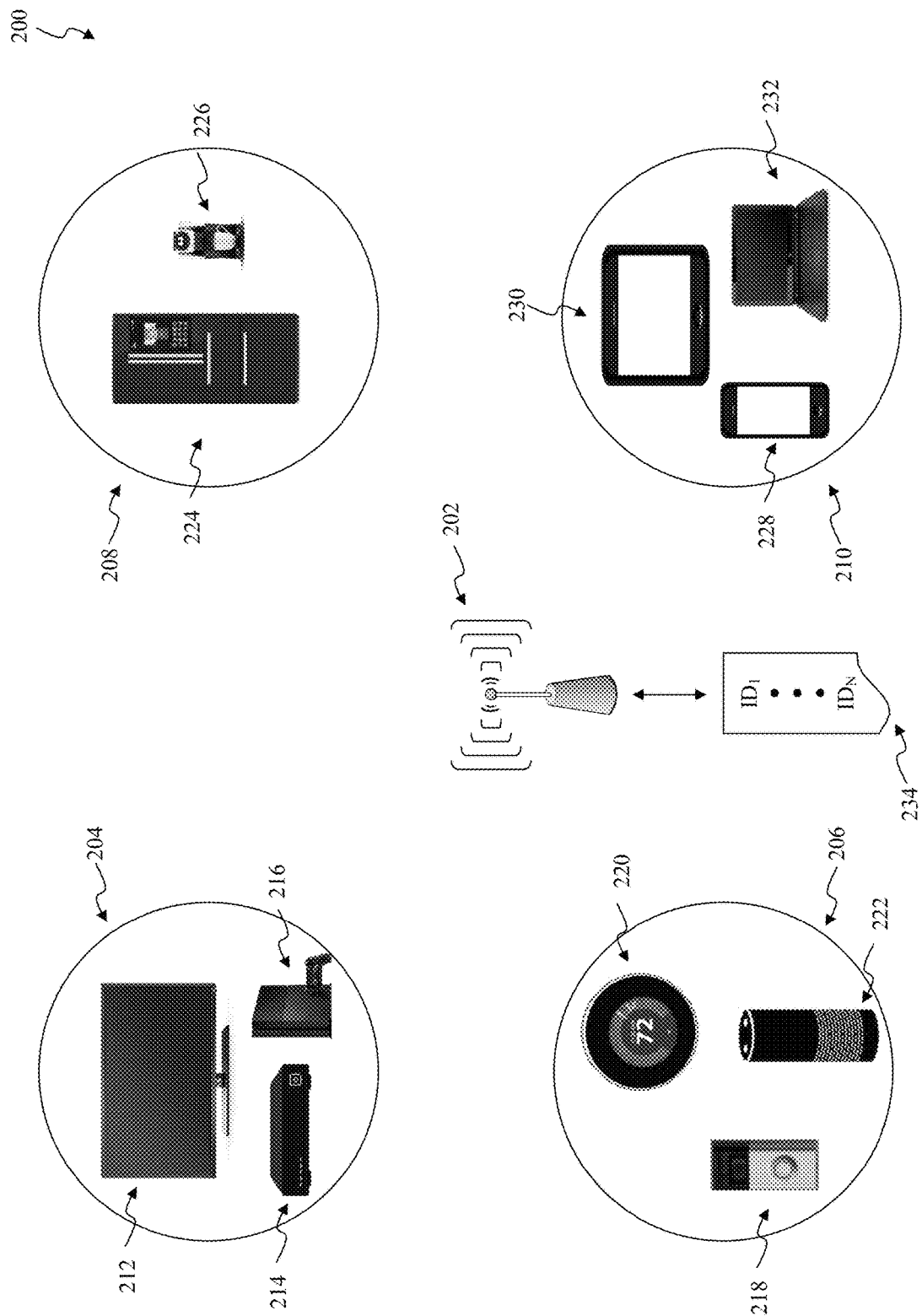
Figure 2B:
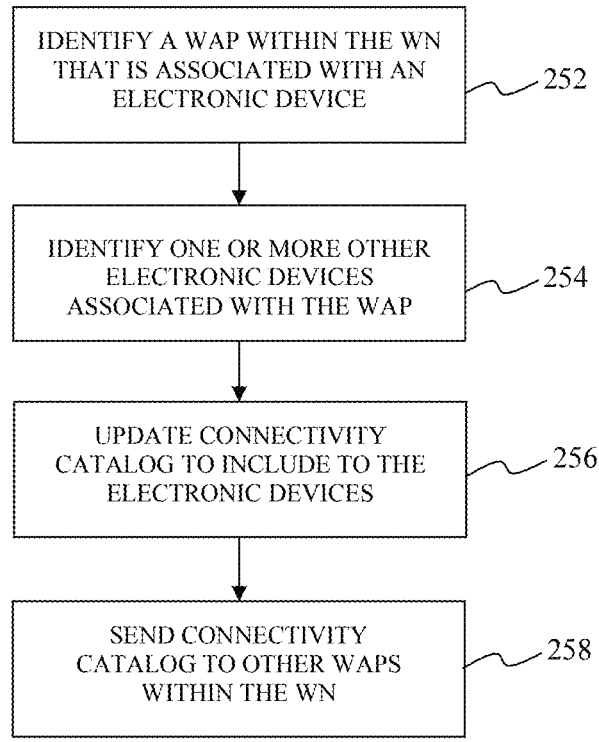
Figure 3:
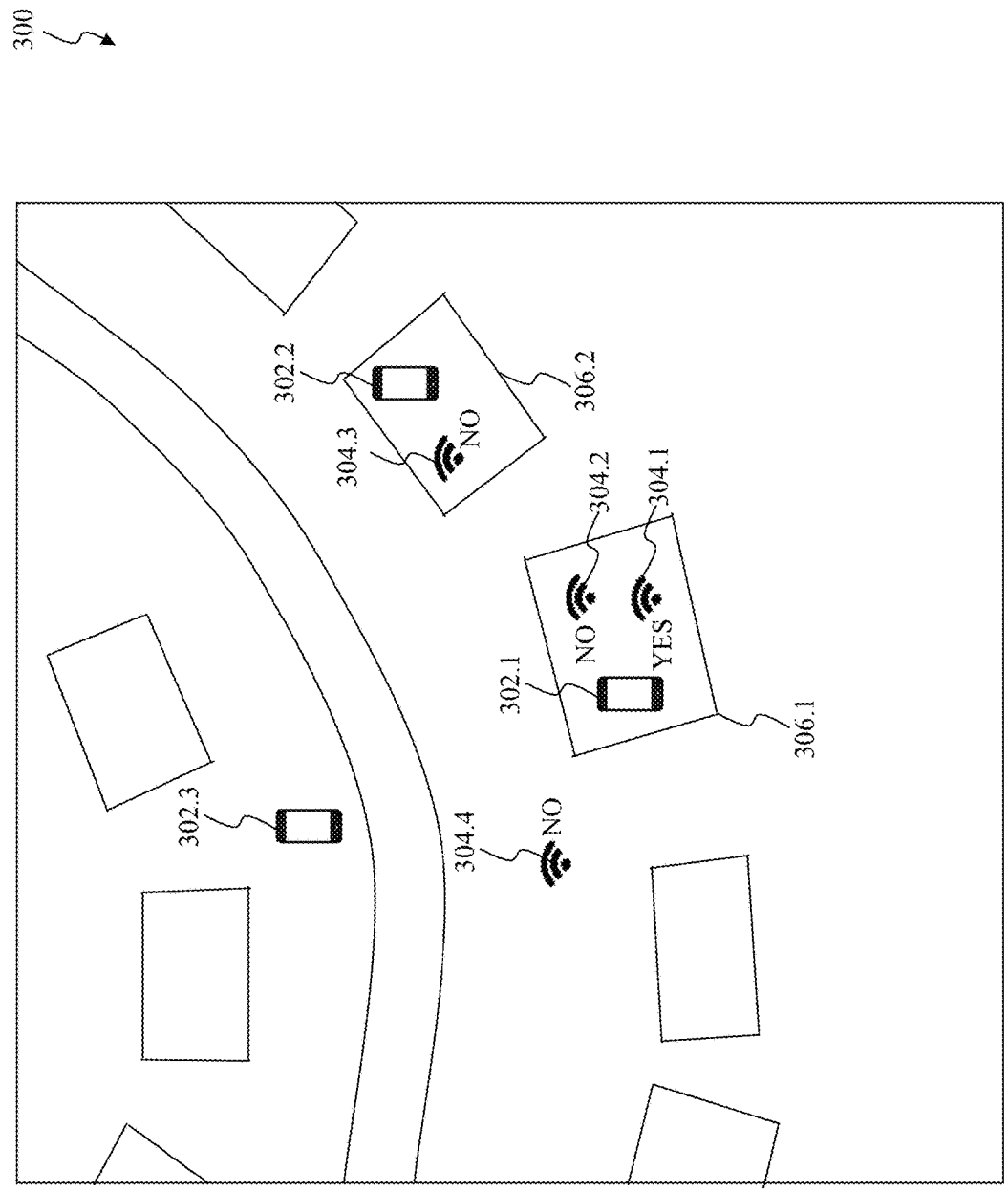
Figure 5:
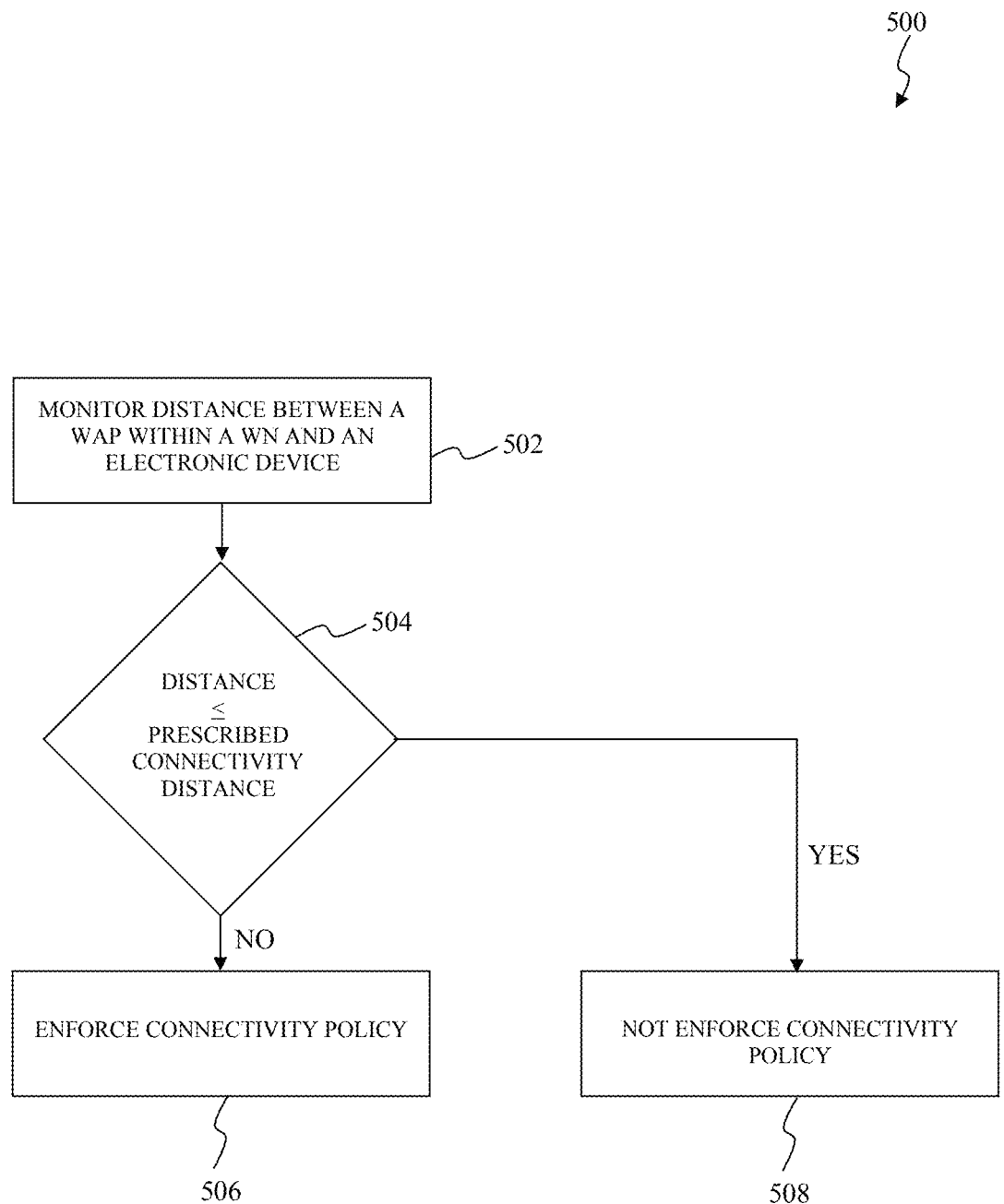
Figure 6:
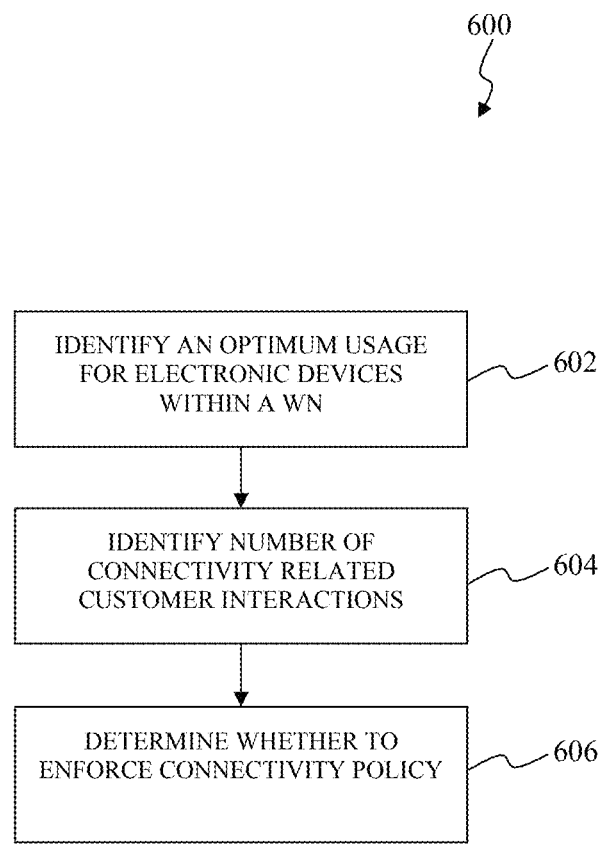
Figure 7:
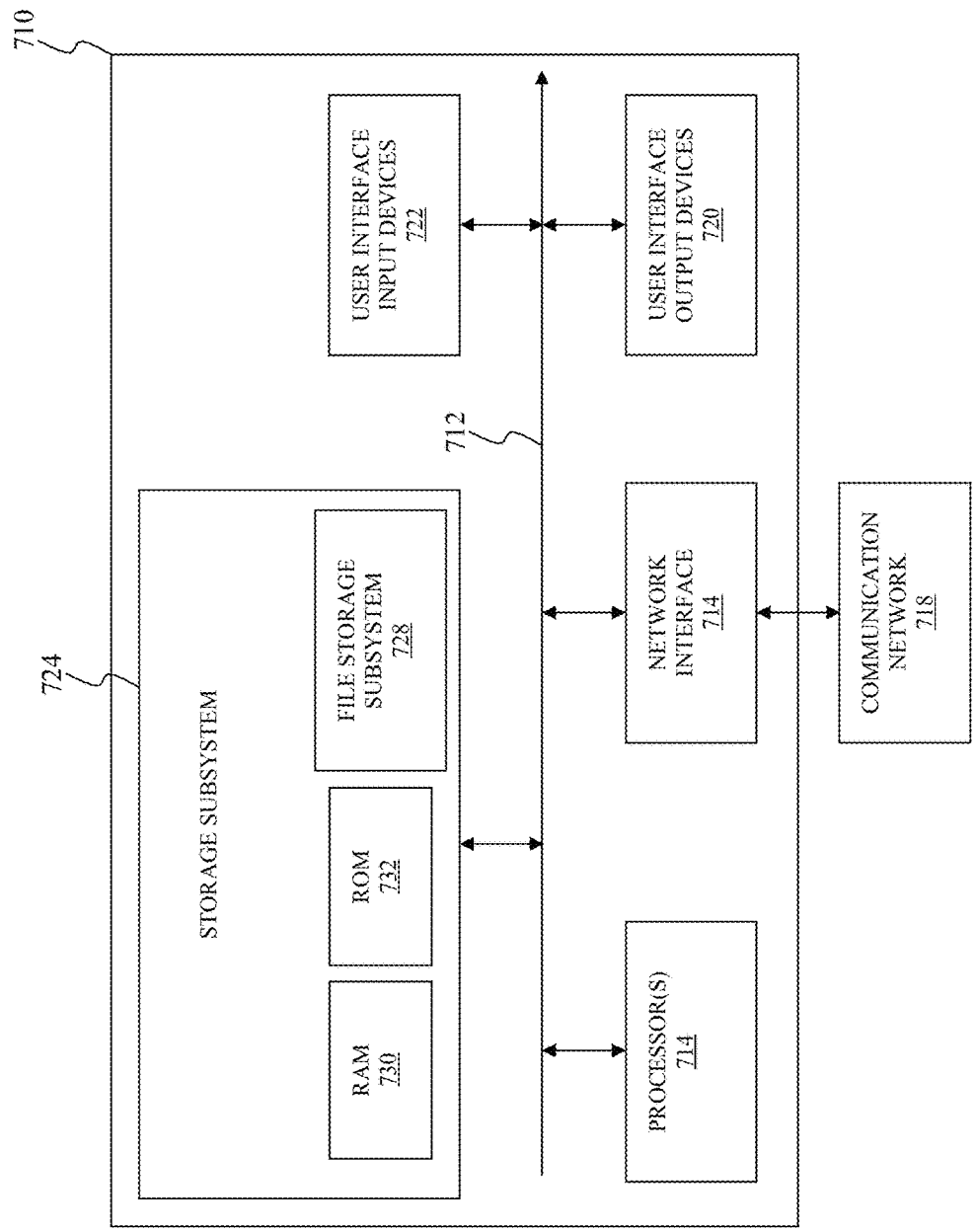

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates a wireless network (WN) according to an exemplary embodiment of the present disclosure;

FIG. 2A graphically illustrates an exemplary underlying wireless network within the exemplary WN according to an exemplary embodiment of the present disclosure;

FIG. 2B illustrates a flowchart of an exemplary operation of the exemplary WN to formulate the connectivity policy according to an exemplary embodiment of the present disclosure;

FIG. 3 graphically illustrates a first exemplary execution of the exemplary connectivity policy according to an exemplary embodiment of the present disclosure;

FIG. 4A through FIG. 4D graphically illustrates a second exemplary execution of the exemplary connectivity policy according to exemplary embodiments of the present disclosure;

FIG. 5 illustrates a first flowchart of an exemplary operation of the exemplary WN to execute the connectivity policy according to an exemplary embodiment of the present disclosure;

FIG. 6 illustrates a second flowchart of an exemplary operation of the exemplary WN to execute the connectivity policy according to an exemplary embodiment of the present disclosure; and FIG. 7 graphically illustrates a simplified block diagram of a computer system suitable for use with embodiments described herein, as well as circuit design and circuit embodiments of the technology, according to an exemplary embodiment of the present disclosure.

The present disclosure will now be described with reference to the accompanying drawings.

DETAILED DESCRIPTION OF THE DISCLOSURE

Overview

The formulation and execution of a connectivity policy is disclosed herein to improve the performance of a wireless network (WN). A wireless access point (WAP) within the WN identifies electronic devices that have been granted access to the WN and/or are associated with the WAP to provide a connectivity catalog that forms the basis of the connectivity policy. This connectivity catalog is communicated to other WAPs within the network. In some situations, these other WAPs can execute the connectivity policy to deny access to electronic devices within the connectivity catalog to their corresponding networks. For example, these other WAPs can execute the connectivity policy on those electronic devices that are within a prescribed connectivity distance from the WAP that provided the connectivity catalog.

Exemplary Wireless Networks

FIG. 1 graphically illustrates a wireless network (WN) according to an exemplary embodiment of the present disclosure. A WN 100 provides wireless communication between an electronic device 102 and wireless access points (WAPs) 104.1 through 104.$n$ within geographical coverage areas 106.1 through 106.$n$. The electronic device 102 can represent a mobile telephony device, such as a mobile phone, a mobile computing device, a mobile internet device, such as a tablet computer and/or a laptop computer, a video game console, a portable media player, a peripheral device, such as mouse, keyboard, monitor, printer and scanner, an internet capable appliance and/or any other suitable communication device that is capable of wireless communication within the WN 100. Moreover, as illustrated in FIG. 1, the geographical coverage areas 106.1 through 106.$n$ can represent relatively small areas, such as within a person's reach, to form a one or more wireless personal area networks (WPANs), short distances within structures, such as homes, schools, computer laboratory, or office buildings, to form one or more wireless local area networks (WLANs), one or more large areas, such as between neighboring towns and cities or a city and suburb, to form one or more wireless wide area network (WWANs), and/or any combination of WPANs, WLANs, and/or WWANs that will be apparent to those skilled in the relevant art(s) without departing from the spirit and scope of the present disclosure.

As illustrated in FIG. 1, the WAPs 104.1 through 104.$n$ represent gateways between the electronic device 102 and a service provider system 108. The electronic device 102 utilizes its corresponding WAP from among the WAPs 104.1 through 104.$n$ to communicate with the service provider system 108. In the exemplary embodiment illustrated in FIG. 1, the WAPs 104.1 through 104.$n$ can include one or more private WAPs and/or one or more public WAPs. The private WAPs represent wireless access points commonly used in residential, office, and enterprise environments to which access is restricted, namely private, through the use of various security measures, such as authentication and/or authorization to provide some examples. The public WAPs represent wireless access points without any such access restrictions wherein anyone, namely the general public, is granted access.

The service provider system 108 represents one or more centralized computing networks to provide a service, such bi-directional communication of information, for example, video, audio, and/or data, to the electronic device 102. For example, the service provider system 108 can provide the electronic device 102 with connectivity to other networks, such as the public Internet to provide an example. As another example, the service provider system 108 can provide media, such as movies, television programs, and/or advertising, to the electronic device 102. As used herein, the term "downstream direction" refers to the transfer of information from the service provider system 108 to the electronic device 102. The term "upstream direction" refers to the transfer of information from the electronic device 102 to the service provider system 108. In the exemplary embodiment illustrated in FIG. 1, the electronic device 102 can also be referred to as a subscriber device. However, the teachings described herein can be readily applied to any point-to-multipoint communication system that will be apparent to those skilled in the relevant art(s) without departing from the spirit and scope of the present disclosure.

In some situations, the geographical coverage areas 106.1 through 106.n can overlap each other allowing the electronic device 102 to communicate with multiple WAPs from among the WAPs 104.1 through 104.n. For example, one or more geographical coverage areas from among the geographical coverage areas 106.1 through 106.n can overlap one or more other geographical coverage areas from among the geographical coverage areas 106.1 through 106.n. As a result, the electronic device 102 can communicate with the service provider system 108 through multiple corresponding WAPs from among the WAPs 104.1 through 104.n. As to be described in further detail below, the WN 100 can implement a connectivity policy to cause the WAPs 104.1 through 104.n to selectively allow and/or to selectively deny access to the electronic device 102 to their corresponding networks. For example, the geographical coverage area 106.1 of the WAP 104.1 can overlap at least some of the geographical coverage area 106.2 of the WAP 104.2. In this example, the WAP 104.1 and the WAP 104.2 can be situated within the same residential, office, and enterprise environments with the WAP 104.1 being a private WAP and the WAP 104.2 being a public WAP. In this example, the connectivity policy, when implemented by the WN 100, can cause the WAP 104.1 to allow the electronic device 102 access to its corresponding network and the WAP 104.2 to deny the electronic device 102 access to its corresponding network.

Generally, the service provider system 108 selectively monitors one or more parameters, characteristics, and/or attributes of a WAP, for example, the WAP 104.1, within the WN 100 and/or of the electronic device 102 and thereafter intelligently executes the connectivity policy in response to the one or more parameters, characteristics, and/or attributes. In an exemplary embodiment, the service provider system 108 monitors a distance between the WAP and the electronic device 102. For example, the service provider system 108 can identify first latitude and first longitude coordinates for the WAP. Then, in this example, the service provider system 108 can identify second latitude and second longitude coordinates for a WAP within the WN 100 that the electronic device 102 is presently associated with. Finally, the service provider system 108 can determine the approximate distance, expressed in feet (ft), between the WAP and the electronic device 102 by using the Haversine formula:

$$= 2r \arcsin\left(\sqrt{\sin^2\left(\frac{\phi_2 - \phi_1}{2}\right) + \cos(\phi_1)\cos(\phi_2)\sin^2\left(\frac{\lambda_2 - \lambda_1}{2}\right)}\right)$$

where r represents an approximation of the radius of the Earth expressed in feet, for example, 20,914,080 feet, $\phi_1$ and $\phi_2$ represent the first latitude and the second latitude, respectively, as described above, and $\lambda_1$ and $\lambda_2$ represent the first longitude and the second longitude, respectively, as described above. In this exemplary embodiment, the service provider system 108 executes the connectivity policy when the electronic device 102 is within a prescribed connectivity distance from the WAP. This prescribed connectivity distance can be a predetermined-fixed distance, for example, one hundred (100) feet, and can be different for varying population densities. Alternatively, or in addition to, the prescribed connectivity distance can be based on one or more parameters, characteristics, and/or attributes of the WAP and/or the electronic device 102. The one or more parameters, characteristics, and/or attributes can include a speed of the downstream direction, a speed of the upstream direction, a transmission power of the WAP and/or the electronic device 102, a received signal strength of the WAP and/or the electronic device 102, and/or an error rate of the downstream direction and/or the upstream direction to provide some examples. As described in further detail below, the WN 100, when executing the connectivity policy, causes the WAP to selectively allow the electronic device 102 access to its corresponding network and public WAPs within connectivity range of the electronic device 102, for example, one or more of the WAPs 104.2 through 104.n, to selectively deny the electronic device 102 access to their corresponding networks.

Formulation of an Exemplary Connectivity Policy

FIG. 2A graphically illustrates an exemplary underlying wireless network within the exemplary WN according to an exemplary embodiment of the present disclosure. In the exemplary embodiment illustrated in FIG. 2A, a wireless network (WN) 200 includes a wireless access point (WAP) 202. The WAP 202 can represent an exemplary embodiment of one or more of the WAPs 104.1 through 104.n. In an exemplary embodiment, the WAP 202 represents a private wireless access point as described above. In this exemplary embodiment, this WAP can be communicatively coupled to various electronic devices to form a private wireless network. Generally, the private network represents a wireless network of wirelessly capable electronic devices to which access to this wireless network is restricted, namely private, through the use of various security measures, such as authentication and/or authorization to provide some examples. In an exemplary embodiment, this private network can be situated within residential, office, and/or enterprise environments. In contrast, a public network represents a wireless network of wirelessly capable electronic devices without any such access restrictions allowing anyone, namely the general public, access. Although, the discussion of the WN 200 to follow describes various electronic devices that can be within the WN 200, these electronic devices are for exemplary purposes only and not limiting. Those skilled in the relevant art(s) will recognize other suitable electronic devices having wireless communication capabilities can also be situated within the WN 200 without departing from the spirit and scope of the present disclosure.

In the exemplary embodiment illustrated in FIG. 2A, the WAP 202 represents a wireless capable communication device that manages communications within the WN 200. In some situations, the WAP 202 can also manage communications between the WN 200 and other wireless networks, wired networks, and/or other electronic devices, such as the service provider system 108 as described above in FIG. 1. In these situations, the WAP 202 effectively operates as a gateway between the WN 200 and these other wireless networks, wired networks, and/or other electronic devices.

As illustrated in FIG. 2A, the WN 200 can include, but is not limited to, one or more wireless media devices 204, one or more wireless automation devices 206, one or more wireless appliance devices 208, and/or one or more mobile communication devices 210. As noted above, these various devices are merely representative of the electronic devices that can be included within the WN 200 and are not limiting. Those skilled in the relevant art(s) will recognize the WN 200 can include any suitable electronic devices having wireless communication capabilities without departing from the spirit and scope of the present disclosure.

The one or more wireless media devices 204, as illustrated in FIG. 2A, represent suitable wirelessly capable electronic devices that provide electronic media for consumption. In the exemplary embodiment illustrated in FIG. 2A, the one or more wireless media devices 204 can include one or more media display devices, such as a television 212, one or more media access devices, such as a set-top box 214, and/or one or more entertainment devices, such as a video gaming console 216. Generally, the one or more wireless automation devices 206 and the one or more wireless appliance devices 208 represent electronic devices that are embedded with electronics, software, sensors, actuators, and network connectivity which enable these devices to communicate, also referred to as the Internet of Things (IoT). In the exemplary embodiment illustrated in FIG. 2A, the one or more wireless automation devices 206 can include one or more environmental control devices, such as a wirelessly capable electronic thermostat 218, one or more wireless security devices, such as a wireless capable video doorbell 220, and/or one or more wirelessly capable control devices, such as a wirelessly capable virtual assistant electronic device 222. In the exemplary embodiment illustrated in FIG. 2A, the one or more wireless appliance devices 208 can include one or more wirelessly capable appliances, such as a wireless capable refrigerator 226 and/or a wireless capable coffee maker 226. The one or more mobile communication devices 210 represent suitable wirelessly capable electronic devices to provide wireless audio, video, and/or data communication. In the exemplary embodiment illustrated in FIG. 2A, the one or more mobile communication devices 210 can include one or more mobile telephony devices, such as a mobile smartphone 228, one or more mobile computing devices, such as a tablet computer 230, and/or one or more mobile internet devices, such as a laptop computer 232.

In the exemplary embodiment illustrated in FIG. 2A, the WAP 202 stores a connectivity catalog 234 which specifies those wirelessly capable electronic devices, such as the one or more wireless media devices 204, the one or more wireless automation devices 206, the one or more wireless appliance devices 208, and/or the one or more mobile communication devices 210, that have been granted access to the WN 200 and/or are associated with the WAP 202. As to be described in further detail below, the connectivity catalog 234 is to form the basis of the connectivity policy. In an exemplary embodiment, each of these wirelessly capable electronic devices undergoes authentication procedure, for example, comparison of usernames and/or passwords, and/or an authorization procedure with the WAP 202 before being granted access to the WN 200. In this exemplary embodiment, once each of these wirelessly capable electronic devices has completed the authentication procedure and/or the authorization procedure, each of these wirelessly capable electronic devices becomes associated with the WAP 202 and is granted access to the WN 200. Thereafter, one or more unique identifiers $ID_1$ through $ID_N$ which uniquely identify those wirelessly capable electronic devices that are granted access to the WN 200 and/or are associated with the WAP 202 are stored in the connectivity catalog 234. In the exemplary embodiment illustrated in FIG. 2A, the one or more unique identifiers $ID_1$ through $ID_N$ can include one or more Internet Protocol (IP) addresses, one or more media access controller (MAC) address, and/or one or more other suitable unique identifiers that will be recognized by those skilled in the relevant art(s) without departing from the spirit and scope of the present disclosure. For example, as illustrated in FIG. 2A, the unique identifier $ID_1$ shown in the connectivity catalog 234 can represent a unique identifier for the television 212 indicating that the television 212 has been granted access to the WN 200 and/or is associated with the WAP 202.

FIG. 2B illustrates a flowchart of an exemplary operation of the exemplary WN to formulate the connectivity policy according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 250 to formulate the connectivity policy as described above. The operational control flow 250 to be described in further detail below can be executed by a service provider system, such as the service provider system 108 as described above, to formulate the connectivity policy as described above.

At operation 252, the operational control flow 250 identifies a wireless access point (WAP), such as the WAP 104.1 as described above in FIG. 1 and/or the WAP 202 as described above in FIG. 2A, within a wireless network (WN), such as the WN 100 as described above in FIG. 1 and/or the WN 200 as described above in FIG. 2A, that is associated with an electronic device, such as the electronic device 102 as described above in FIG. 1 and/or any of the electronic devices as described above in FIG. 2A. In an exemplary embodiment, the electronic device represents a subscriber device that has entered into a service agreement with a service provider to provide a service to a residential, office, or enterprise environment. In this exemplary embodiment, the WAP represents a private WAP as described above.

At operation 254, the operational control flow 250 identifies one or more other devices, for example, as described above in FIG. 2A, that are associated with the WAP from operation 254. These other devices are often communicatively coupled to the WAP from operation 252 to form a private network as described above and can include one or more wireless media devices, one or more wireless automation devices, one or more wireless appliance devices, and/or one or more mobile communication devices as described above in FIG. 2A.

At operation 256, the operational control flow 250 updates a connectivity catalog, such as the connectivity catalog 234 as described above in FIG. 2A, to include the electronic device from operation 252 and the one or more other electronic devices from operation 254. The connectivity catalog is updated to include one or more unique identifiers which uniquely the electronic device from operation 252 and the one or more other electronic devices from operation 254. In the exemplary embodiment illustrated in FIG. 2B, the one or more unique identifiers can include one or more Internet Protocol (IP) addresses, one or more media access controller (MAC) address, and/or one or more other suitable unique identifiers that will be recognized by those skilled in the relevant art(s) without departing from the spirit and scope of the present disclosure.

At operation 258, the operational control flow 250 sends the connectivity catalog from operation 256 to one or more other WAPs, such as one or more of the WAPs 104.2 through WAP 104.*n* as described above in FIG. 1, within the WN to formulate the connectivity policy. In an exemplary embodiment, the one or more other WAPs represent public WAPs as described above.

Execution of the Exemplary Connectivity Policy

Referring back to FIG. 2A, the WAP 202 communicates the connectivity catalog 234 to neighboring WAPs within the WN 100 to restrict access of the wirelessly capable electronic devices included within the connectivity catalog 234 to the WAP 202. The wirelessly capable electronic devices included within the connectivity catalog 234 are denied access to corresponding networks of the neighboring WAPs within the WN 100. For example, assuming the WAP 202 is an exemplary embodiment of the WAP 104.1 as described in FIG. 1 and the electronic device 102 as described in FIG. 1 is included within the connectivity catalog 234, the WAP 104.1 communicates the connectivity catalog 234 to one or more of the WAPs 104.2 through WAP 104.*n*. In this example, those WAPs having the electronic device 102 within their connectivity catalog 234 deny access to the electronic device 102 to their corresponding networks. To these neighboring WAPs, the connectivity catalog 234 represents an access control mechanism, also referred to as a "Blacklist," which causes these neighboring WAPs to grant access to all wirelessly capable electronic devices to their corresponding networks except to the wirelessly capable electronic devices included within the connectivity catalog 234.

FIG. 3 graphically illustrates a first exemplary execution of the exemplary connectivity policy according to an exemplary embodiment of the present disclosure. As illustrated in FIG. 3, an exemplary wireless network (WN) 300 provides wireless communication between electronic devices 302.1 through 302.3 and wireless access points (WAPs) 304.1 through 304.3. In an exemplary embodiment, the WAP 304.1 represents a private wireless access point as described above and/or the WAP 304.2 and 304.3 represent public WAPs as described above. Those skilled in the relevant art(s) will recognize the WN 300 can include WAPs than as illustrated in FIG. 3 without departing from the spirit and scope of the present disclosure. However, to ease explanation, geographical coverage areas of the private WAP 302 and/or public WAPs 304.1 through 304.3 are not illustrated in FIG. 3. In the exemplary embodiment illustrated in FIG. 3, the geographical coverage areas of the WAPs 304.1 through 304.3 overlap each other such that the electronic devices 302.1 through 302.3 can communicate with any combination or combinations of the WAPs 304.1 through 304.3. The WN 300 can represent an exemplary embodiment of the WN 100 as described above in FIG. 1. As such, the electronic devices 302.1 through 302.3 can each represent an exemplary embodiment of the electronic device 102 as described above in FIG. 1.

As illustrated in FIG. 3, the WAPs 304.1 and 304.2 are situated within a residential, office, or enterprise environment 306.1, the WAP 304.3 is situated within a residential, office, or enterprise environment 306.2, and the WAP 304.4 is situated outside of these residential, office, or enterprise environments. In an exemplary embodiment, a user or users of the electronic devices 302.1 through 302.3 enter into a service agreement with a service provider to provide a service to the residential, office, or enterprise environment 306.1. The service agreement often defines a quality of service (QOS), for example, a speed of the downstream direction or a speed of the upstream direction, between the WAP 304.1 when within the residential, office, or enterprise environment 306.1 and a service provider system of the service provider, such as the service provider system 108 to provide an example. The WAP 304.1 provides a connectivity catalog, such as the connectivity catalog 234 to provide an example, to the WAPs 304.2 through 304.4 that includes the electronic devices 302.1 through 302.3 in a substantially similar manner as described above in FIG. 2A. The WAPs 304.2 through 304.4 utilize the connectivity catalog to form a connectivity policy to determine whether to restrict and/or to grant access of the electronic devices 302.1 through 302.3 to their corresponding networks.

In the exemplary embodiment illustrated in FIG. 1, the electronic devices 302.1 through 302.3 send connectivity requests to establish communication with one or more of the WAPs 304.1 through 304.3. Thereafter, the electronic devices 302.1 through 302.3 and the one or more of the WAPs 304.1 through 304.3 undergo a handshaking procedure to establish the communication. As part of this handshaking procedure, the one or more of the WAPs 304.1 through 304.3 determine whether to enforce the connectivity policy. As part of this determination, the one or more of the WAPs 304.1 through 304.3 search the connectivity catalog for the electronic devices 302.1 through 302.3 before the communication is established. The one or more of the WAPs 304.1 through 304.3 refuse communication from a corresponding electronic device from among the electronic devices 302.1 through 302.3 when the corresponding electronic device is located within the connectivity catalog. As such, these WAPs thereafter deny access to the corresponding electronic device to their corresponding networks. Otherwise, one or more of the WAPs 304.1 through 304.3 accept communication from the corresponding electronic device from among the electronic devices 302.1 through 302.3 when the corresponding electronic device is not located within the connectivity catalog. As such, these WAPs thereafter become associated with the corresponding electronic device and/or grant access to the corresponding electronic device to their corresponding networks.

As illustrated in FIG. 3, the electronic device 306.1 is situated within the residential, office, or enterprise environment 306.1, the electronic device 306.2 is situated within the neighboring residential, office, or enterprise environment 310, and the electronic device 306.3 is outside of the residential, office, or enterprise environment 306.1 and the neighboring residential, office, or enterprise environment 310. In the exemplary embodiment illustrated in FIG. 3, the WAP 304.1 grants access to the electronic devices 302.1 through 302.3 to its corresponding network as indicated by "YES" in FIG. 3. In contrast, the connectivity policy, when enforced by the WAPs 304.2 through 304.4, causes the WAPs 304.2 through 304.4 to deny access to the electronic devices 302.1 through 302.3 to their corresponding networks as indicated by "NO" in FIG. 3 since the electronic devices 302.1 through 302.3 are included within the connectivity catalog stored by the WAPs 304.2 through 304.4. Even though the electronic device 306.2 and the electronic device 306.3 are closer in geographical location to the WAP 304.3 and the WAP 304.4, respectively, these WAPs deny access to the electronic device 306.2 and the electronic device 306.3 to their corresponding networks when the connectivity policy is enforced on the WN 300.

FIG. 4A through FIG. 4D graphically illustrates a second exemplary execution of the exemplary connectivity policy according to exemplary embodiments of the present disclosure. As illustrated in FIG. 4A through FIG. 4D, an exemplary wireless network (WN) 400 provides wireless communication between electronic devices 402.1 through 402.4 and wireless access points (WAPs) 404.1 through 404.6. In an exemplary embodiment, the WAP 404.1 represents a private wireless access point as described above and/or the WAPs 404.2 through 404.6 represent public WAPs as described above. Those skilled in the relevant art(s) will recognize the WN 400 can include WAPs than as illustrated in FIG. 4A through FIG. 4D without departing from the spirit and scope of the present disclosure. However, to ease explanation, geographical coverage areas of the WAPs 404.1 through 404.6 are not illustrated in FIG. 4A through FIG. 4D. In the exemplary embodiment illustrated in FIG. 4A through FIG. 4D, the geographical coverage areas of the WAPs 404.1 through 404.6 overlap each other such that the electronic devices 402.1 through 402.4 can communicate with any combination or combinations of the WAPs 404.1 through 404.6. The WN 400 can represent an exemplary embodiment of the WN 100 as described above in FIG. 1. As such, the electronic devices 402.1 through 402.4 can each represent exemplary embodiments of the electronic device 102 as described above in FIG. 1.

As illustrated in FIG. 4A through FIG. 4D, the WAPs 404.1 and 404.2 are situated within a residential, office, or enterprise environment 406.1, the WAP 404.3 is situated within a residential, office, or enterprise environment 406.2, the WAP 404.5 is situated within a residential, office, or enterprise environment 406.3, and the WAP 404.4 and 404.6 are situated outside of these residential, office, or enterprise environments. In an exemplary embodiment, a user or users of the electronic devices 402.1 through 402.4 enter into a service agreement with a service provider to provide a service to the residential, office, or enterprise environment 406.1 in a substantially similar manner as described above in FIG. 3. The WAP 404.1 provides a connectivity catalog, such as the connectivity catalog 244 to provide an example, to the WAPs 404.2 through 404.6 that includes the electronic devices 402.1 through 402.4 in a substantially similar manner as described above in FIG. 2A. The WAPs 404.2 through 404.6 utilize the connectivity catalog to form a connectivity policy to determine whether to restrict and/or to grant access of the electronic devices 402.1 through 402.4 to their corresponding networks.

Moreover, in the exemplary embodiments illustrated in FIG. 4A through FIG. 4D, the WN 400 selectively monitors one or more parameters, characteristics, and/or attributes of the WAP 404.1 and/or of the electronic devices 402.1 through 402.4 and thereafter intelligently executes the connectivity policy in response to the one or more parameters, characteristics, and/or attributes. In an exemplary embodiment, the WAP 404.1 monitors distances between the WAP 404.1 and the electronic devices 402.1 through 402.4. In this exemplary embodiment, the WN 400 executes the connectivity policy on those the electronic devices from among the electronic devices 402.1 through 402.4 situated within a prescribed connectivity distance D from the WAP 404.1. This prescribed connectivity distance D can be a predetermined-fixed distance, for example, one hundred (100) feet, and can be different for varying population densities and/or be based upon one or more signaling characteristics of the WAP 404.1. The one or more signaling characteristics can include a speed of the downstream direction, a speed of the upstream direction, a transmission power of the WAP 404.1 and/or the electronic devices 402.1 through 402.4, a received signal strength of the WAP 404.1 and/or the electronic devices 402.1 through 402.4, and/or an error rate of the downstream direction and/or the upstream direction to provide some examples.

Figure 4A:
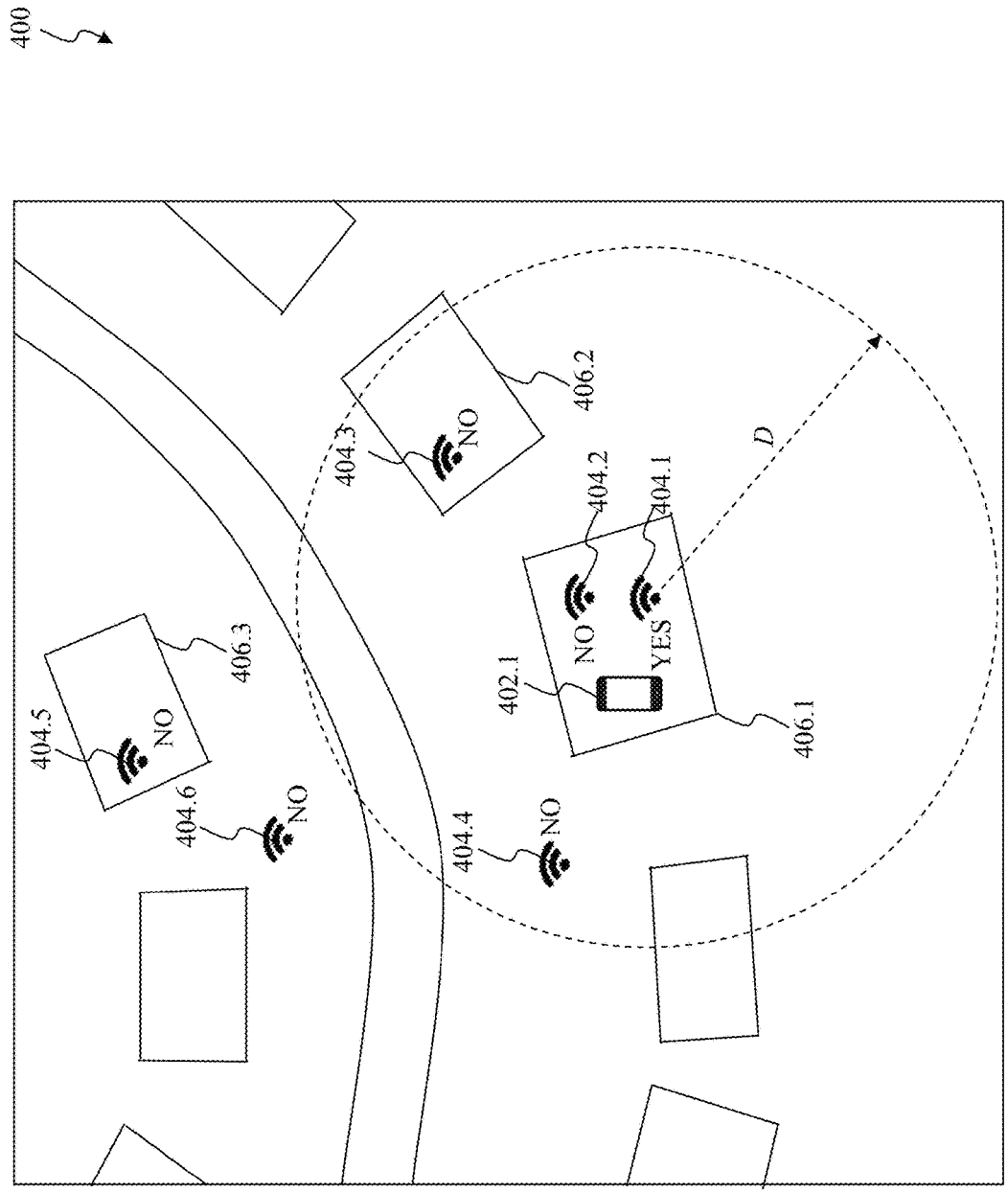
Figure 4B:
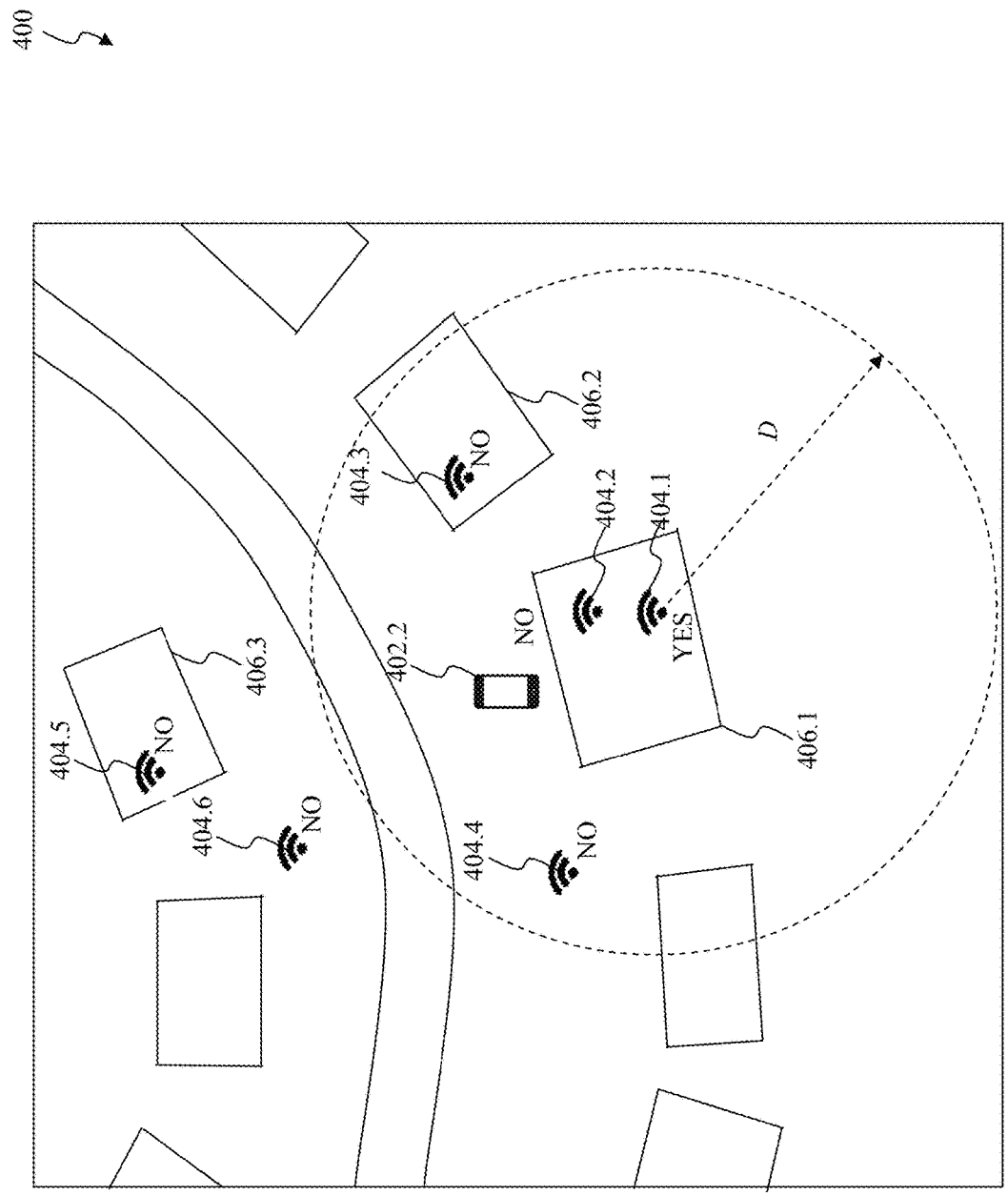
Figure 4C:
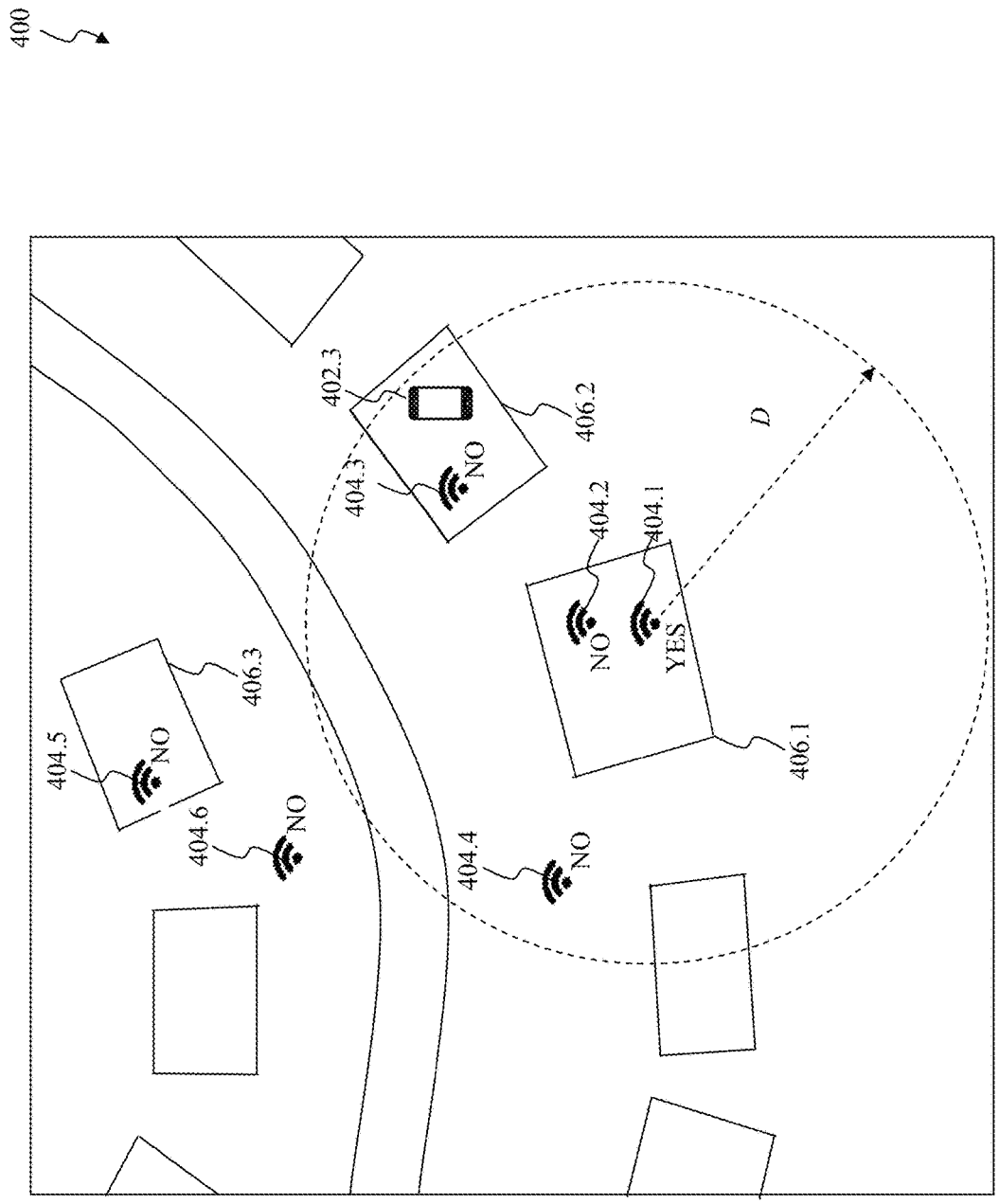
Figure 4D:
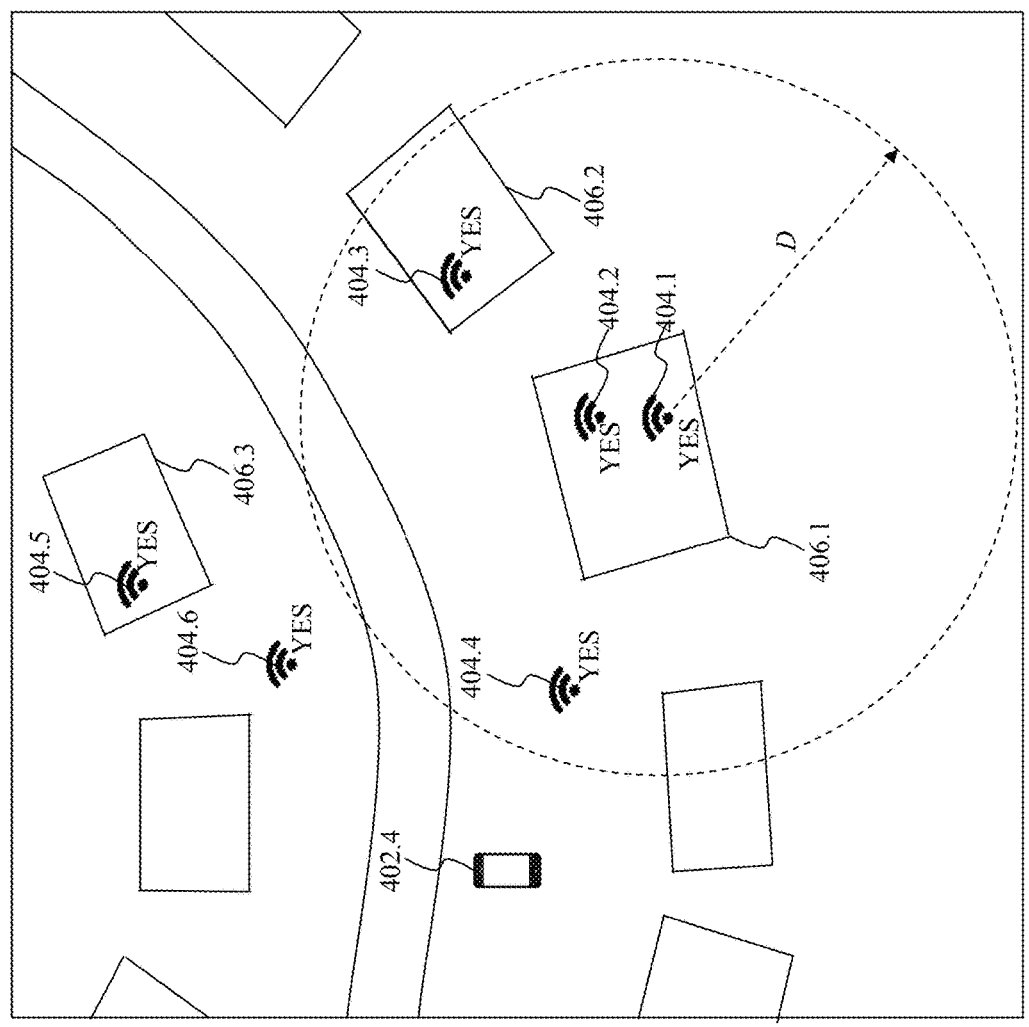

In the exemplary embodiments illustrated in FIG. 4A through FIG. 4D, the WAP 404.1 monitors distances between the electronic devices 402.1 through 402.3 and the WAP 404.1. Because the electronic devices 402.1 through 402.3 are situated within the prescribed connectivity distance D from the WAP 404.1 as illustrated in FIG. 4A through FIG. 4C, the WAP 404.1 signals the WAPs 404.2 through 404.6 to enforce the connectivity policy. Alternatively, the WAP 404.1 can provide the connectivity catalog to the WAPs 404.2 through 404.6 to cause the WAPs 404.2 execute the connectivity policy. In the exemplary embodiments illustrated in FIG. 4A through FIG. 4C, the WAP 404.1 grants access to the electronic devices 402.1 through 402.3 to its corresponding network as indicated by "YES" and the WAPs 404.2 through 404.6 deny access to the electronic devices 402.1 through 402.3 to their corresponding networks as indicated by "NO" in FIG. 4A through FIG. 4C in a substantially similar manner as described above in FIG. 3. Because the electronic device 402.4 is situated outside of the prescribed connectivity distance D from the WAP 404.1 as illustrated in FIG. 4D, the WAP 404.1 signals the WAPs 404.2 through 404.6 to not enforce the connectivity policy with the electronic device 402.4. In this situation, any of the WAPs 404.1 through 404.6 can grant access to the electronic device 402.4 to their corresponding network and/or can be associated with the electronic device 402.4 as appropriate as indicated by "YES" in FIG. 4D.

FIG. 5 illustrates a first flowchart of an exemplary operation of the exemplary WN to execute the connectivity policy according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 500 to execute the connectivity policy as described above. The operational control flow 500 to be described in further detail below can be executed by a service provider system, such as the service provider system 108 as described above, to execute the connectivity policy as described above.

At operation 502, the operational control flow 500 monitors a distance between a wireless access point (WAP), such as the WAP 104.1 as described above in FIG. 1 and/or the WAP 202 as described above in FIG. 2A, within a wireless network (WN), such as the WN 100 as described above in FIG. 1 and/or the WN 200 as described above in FIG. 2A, and an electronic device, such as the electronic device 102 as described above in FIG. 1. In the exemplary embodiment illustrated in FIG. 5, the electronic device can be characterized as being associated with the WAP and/or has been granted access to a corresponding network of the WAP. In an exemplary embodiment, the corresponding network of the WAP represents a private network as described above with the WAP being a private WAP.

At operation 504, the operational control flow 500 compares the distance from operation 502 with a prescribed connectivity distance, such as the prescribed connectivity distance as described above in FIG. 4A through FIG. 4D. This prescribed connectivity distance D can be a predetermined-fixed distance, for example, one hundred (100) feet, and can be different for varying population densities and/or be based upon one or more signaling characteristics of the WAP from operation 502. The one or more signaling characteristics can include a speed of the downstream direction, a speed of the upstream direction, a transmission power of the WAP from operation 502 and/or the electronic device from operation 502, a received signal strength of the WAP from operation 502 and/or the electronic device from operation 502, and/or an error rate of the downstream direction and/or the upstream direction to provide some examples. The operational control flow 500 proceeds to operation 506 when the distance from operation 502 is less than or equal to the prescribed connectivity distance. Otherwise, the operational control flow 500 proceeds to operation 506 when the distance from operation 502 is greater than the prescribed connectivity distance.

At operation 506, the operational control flow 500 enforces the connectivity policy. In this situation, one or more neighboring WAPs, such as one or more of the WAPs 104.2 through 104.n as described above in FIG. 1, search the connectivity catalog for the electronic device from operation 502. The one or more neighboring WAPs deny access to the electronic device from operation 502 to their corresponding networks when the connectivity catalog includes the electronic device from operation 502. Otherwise, the electronic device from operation 502 can become freely associated with the WAP from operation 502 and/or any of the one or more neighboring WAPs and/or be freely granted access to any of the corresponding networks of the WAP from operation 502 and/or the one or more neighboring WAPs as appropriate when the connectivity catalog does not include the electronic device from operation 502.

At operation 506, the operational control flow 500 does not enforce the connectivity policy. In this situation, the electronic device from operation 502 can become freely associated with the WAP from operation 502 and/or any of the one or more neighboring WAPs from operation 506 and/or be freely granted access to any of the corresponding networks of the WAP from operation 502 and/or one or more neighboring WAPs from operation 506 as appropriate.

FIG. 6 illustrates a second flowchart of an exemplary operation of the exemplary WN to execute the connectivity policy according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 to execute the connectivity policy as described above. The operational control flow 600 to be described in further detail below can be executed by a service provider system, such as the service provider system 108 as described above, to execute the connectivity policy as described above. The operational control flow 600 can represent an alternative to or be in addition to the operational control flow 500 as described above in FIG. 5.

At operation 602, the operational control flow 600 identifies an optimum usage for electronic devices, such as the electronic device 102 as described above in FIG. 1, utilizing a wireless network (WN), such as the WN 100 as described above in FIG. 1 and/or the WN 200 as described above in FIG. 2A, to a usage threshold. The operational control flow 600 can quantify this optimum usage in terms of total sessions, total minutes, and/or data passed to provide some examples.

At operation 604, the operational control flow 600 identifies a number of connectivity related customer interactions from users of the electronic devices from operation 602 utilizing or attempting to utilize the WN from operation 602. These connectivity related customer interactions can represent, for example, service calls to the service provider relating to usage of the WN from operation 602.

At operation 606, the operational control flow 600 analyzes the optimum usage from operation 602 and/or the number of connectivity related customer interactions from operation 604 to determine whether to enforce the connectivity policy. In an exemplary embodiment, the operational control flow 600 can convert the optimum usage from operation 602 and/or the number of connectivity related customer interactions from operation 604 into a normalized standard range based on the cumulative probability. These standard ranges for the optimum usage from operation 602 and/or the number of connectivity related customer interactions from operation 604 can be thereafter weighted to provide a weighted score as follows:

| Variable | Weight |
|---|---|
| Total Sessions | 20% |
| Total Minutes | 20% |
| Data Passed | 10% |
| Total Connectivity Calls | 50% |

The operational control flow 600 can compare the result weighted score to an impact threshold to determine whether to enforce the connectivity policy. An exemplary analysis performed by the operational control flow 600 is illustrated below for exemplary users, denoted by User IDs of 130, 50, and 88 in the charts below:

| User ID | Total Minutes | Total Minutes (Normalized) | Data Passed | Data Passed (Normalized) | Total Sessions | Total Sessions (Normalized) |
|---|---|---|---|---|---|---|
| 130 | 5000 | 0.9982 | 440 | 0.4550 | 442 | 0.9999 |
| 50 | 10632 | 1.000 | 48 | 0.3760 | 224 | 0.9613 |
| 88 | 4258 | 0.9923 | 174 | 0.4010 | 90 | 0.7155 |

| User ID | Connectivity Customer Interactions | Connectivity Customer Interactions (Normalized) | Weighted Score |
|---|---|---|---|
| 130 | 2 | 0.9978 | 0.9440 |
| 50 | 4 | 1.0000 | 0.9299 |
| 88 | 2 | 0.9978 | 0.8806 |

As denoted by the charts above, the user having the User ID of 130 has a weighted score of 0.9440, the user having the User ID of 50 has a weighted score of 0.9299, and the user having the User ID of 88 has a weighted score of 0.8806 indicating that enforcement of the connectivity policy on the user having the User ID of 130 can have more of an impact in improving performance of the WN from operation 602 for this user as compared to the User ID of 50.

Exemplary Computer System that can be Utilized to Implement Devices within the Exemplary Wireless Network FIG. 7 graphically illustrates a simplified block diagram of a computer system suitable for use with embodiments described herein, as well as circuit design and circuit embodiments of the technology, according to an exemplary embodiment of the present disclosure. The various electronic devices, wireless access points (WAPs), and/or service provider systems as described above can be implemented in hardware, firmware, software, or any combination thereof. The discussion of FIG. 7 to follow describes an exemplary computer system 710 that can be used for these implementations.

In the exemplary embodiment illustrated in FIG. 7, the computer system 710 typically includes at least one processor 714 which communicates with a number of peripheral devices via bus subsystem 712. Typically, the at least processor 714 can include, or can be, any of a microprocessor, graphics processing unit, or digital signal processor, and their electronic processing equivalents, such as an Application Specific Integrated Circuit ('ASIC') or Field Programmable Gate Array ('FPGA'). As used herein, the term 'processor' signifies a tangible data and information processing device that physically transforms data and information, typically using a sequence transformations (also referred to as 'operations'). Data and information can be physically represented by an electrical, magnetic, optical or acoustical signal that is capable of being stored, accessed, transferred, combined, compared, or otherwise manipulated by the processor. The term 'processor' can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a 'cloud computing' environment or as a 'software as a service' (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 7, these peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. In the exemplary embodiment illustrated in FIG. 7, the network interface subsystem 716 provides an interface to outside networks, including an interface to a communication network 718, and is coupled via a communication network 718 to corresponding interface devices in other computer systems or machines. The communication network 718 may comprise many interconnected computer systems, machines and communication links. These communication links may be wireline links, optical links, wireless links, or any other devices for communication of information. The communication network 718 can be any suitable computer network, for example a wide area network such as the Internet, and/or a local area network such as Ethernet. The communication network 718 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 722 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term 'input device' is intended to include all possible types of devices and ways to input information into the computer system 710 or onto the communication network 718. The user interface input devices 722 typically allow a user to select objects, icons, text and the like that appear on some types of user interface output devices, for example, a display subsystem.

The user interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term 'output device' is intended to include all possible types of devices and ways to output information from the computer system 710 to the user or to another machine or computer system.

The memory subsystem 726 typically includes a number of memories including a main random-access memory ('RAM') 730 (or other volatile storage device) for storage of instructions and data during program execution and a read only memory ('ROM') 732 in which fixed instructions are stored. The file storage subsystem 728 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 728.

The bus subsystem 712 provides a device for letting the various components and subsystems of the computer system 710 communicate with each other as intended. Although the bus subsystem 712 is shown schematically as a single bus, alternative embodiments of the bus subsystem may use multiple busses. For example, RAM-based main memory can communicate directly with file storage systems using Direct Memory Access ('DMA') systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A wireless network, comprising:
   a first wireless access point from among a plurality of wireless access points within the wireless network, the first wireless access point being configured to store a connectivity catalog that specifies an electronic device; and
   a second wireless access point from among the plurality of wireless access points configured to:
   receive the connectivity catalog from the first wireless access point,
   determine that the electronic device is specified in the connectivity catalog in response to the electronic device attempting to access the second wireless access point,
   restrict access by the electronic device to the second wireless access point when a distance between the electronic device and the first wireless access point is less than or equal to a prescribed connectivity distance, and
   grant the electronic device access to the second wireless access point when the distance between the electronic device and the first wireless access point is greater than the prescribed connectivity distance.

2. The wireless network of claim 1, wherein the first wireless access point is configured to store the electronic device within the connectivity catalog in response to the electronic device becoming associated with the first wireless access point and being granted access to the wireless network.

3. The wireless network of claim 2, wherein the first wireless access point is configured to store the electronic device within the connectivity catalog in response to the electronic device completing an authentication procedure or an authorization procedure with the first wireless access point before becoming associated with the first wireless access point and before being granted access to the wireless network.

4. The wireless network of claim 1, wherein the second wireless access point is further configured to receive a connectivity request from the electronic device to establish communication with the second wireless access point.

5. The wireless network of claim 4, wherein the second wireless access point is configured to:
   deny the connectivity request from the electronic device when the distance between the electronic device and the first wireless access point is less than or equal to the prescribed connectivity distance; and
   grant the connectivity request from the electronic device when the distance between the electronic device and the first wireless access point is greater than the prescribed connectivity distance.

6. The wireless network of claim 1, wherein the prescribed connectivity distance is based on a population density of a geographical area of the wireless network.

7. A wireless access point from among a plurality of wireless access points within a wireless network, the wireless access point comprising:
   a memory that stores a connectivity catalog that specifies a plurality of electronic devices; and
   a processor configured to execute instructions stored in the memory, the instructions, when executed by the processor, configuring the processor to:
   determine whether an electronic device attempting to access the wireless access point is from among the plurality of electronic devices specified within the connectivity catalog, when the electronic device is from among the plurality of electronic devices specified in the connectivity catalog:
restrict the electronic device access to the wireless access point when a distance between the electronic device and a second wireless access point from among the plurality of wireless access points is less than or equal to a prescribed connectivity distance, and
grant the electronic device access to the wireless access point when the distance between the electronic device and the second wireless access point is greater than the prescribed connectivity distance, and
when the electronic device is not from among the plurality of electronic devices specified in the connectivity catalog, grant the electronic device access to the wireless access point regardless of the distance between the electronic device and the second wireless access point.

8. The wireless access point of claim 7, wherein the plurality of electronic devices specified in the connectivity catalog have become associated with the second wireless access point and have been granted access to the wireless network.

9. The wireless access point of claim 8, wherein the plurality of electronic devices have completed an authentication procedure or an authorization procedure with the second wireless access point before becoming associated with the second wireless access point and before being granted access to the wireless network.

10. The wireless access point of claim 7, wherein the instructions, when executed by the processor, further configure the processor to receive a connectivity request from the electronic device to establish communication with the wireless access point.

11. The wireless access point of claim 10, wherein the instructions, when executed by the processor, configure the processor to:
deny the connectivity request from the electronic device when the distance between the electronic device and the second wireless access point is less than or equal to the prescribed connectivity distance; and
grant the connectivity request from the electronic device when the distance between the electronic device and the second wireless access point is greater than the prescribed connectivity distance.

12. The wireless access point of claim 7, wherein the prescribed connectivity distance is based on a population density of a geographical area of the wireless network.

13. The wireless access point of claim 7, wherein the prescribed connectivity distance comprises a predetermined-fixed distance.

14. A method for executing a connectivity policy within a wireless network, the method comprising:
receiving, by a wireless access point that is outside of a residential, office, or enterprise environment that receives a service from a service provider, a connectivity catalog that specifies a plurality of electronic devices;
determining, by the wireless access point, whether an electronic device attempting to access the wireless access point is from among the plurality of electronic devices specified within the connectivity catalog,
when the electronic device is from among the plurality of electronic devices specified in the connectivity catalog:
restricting, by the wireless access point, the electronic device access to the wireless access point when a distance between the electronic device and a second wireless access point within the residential, office, or enterprise environment from among a plurality of wireless access points is less than or equal to a prescribed connectivity distance, and
granting, by the wireless access point, the electronic device access to the wireless access point when the distance between the electronic device and the second wireless access point is greater than the prescribed connectivity distance, and
when the electronic device is not from among the plurality of electronic devices specified in the connectivity catalog, granting, by the wireless access point, the electronic device access to the wireless access point regardless of the distance between the electronic device and the second wireless access point.

15. The method of claim 14, wherein the plurality of electronic devices specified in the connectivity catalog have become associated with the second wireless access point and have been granted access to the wireless network.

16. The method of claim 15, wherein the plurality of electronic devices have completed an authentication procedure or an authorization procedure with the second wireless access point before becoming associated with the second wireless access point and before being granted access to the wireless network.

17. The method of claim 14, further comprising receiving, by the wireless access point, a connectivity request from the electronic device to establish communication with the wireless access point.

18. The method of claim 17, wherein the restricting the electronic device access to the wireless access point when the distance between the electronic device and the second wireless access point is less than or equal to the prescribed connectivity distance comprises denying the connectivity request from the electronic device when the distance between the electronic device and the second wireless access point is less than or equal to the prescribed connectivity distance,
wherein the granting the electronic device access to the wireless access point when the distance between the electronic device and the second wireless access point is greater than the prescribed connectivity distance comprises granting the connectivity request from the electronic device when the distance between the electronic device and the second wireless access point is greater than the prescribed connectivity distance.

19. The method of claim 14, wherein the prescribed connectivity distance is based on a population density of a geographical area of the wireless network.

20. The method of claim 14, wherein the prescribed connectivity distance comprises a predetermined-fixed distance.

* * * * *